United States Patent

Trepka

[15] 3,687,998
[45] Aug. 29, 1972

[54] ALIPHATIC SULFONOXYPHENYLUREAS

[72] Inventor: Robert D. Trepka, 2501 Hudson Road, St. Paul, Minn. 55101

[22] Filed: Dec. 16, 1968

[21] Appl. No.: 784,251

[52] U.S. Cl. ............................. 260/456 A, 71/103
[51] Int. Cl. ................................. C07c 143/68
[58] Field of Search .................. 260/456 A; 71/103

[56] References Cited

UNITED STATES PATENTS 3,234,255 2/1966 Hackmann et al. .........260/454
3,383,195 5/1968 Drummond et al. ....260/456 A
3,326,663 6/1967 Soloway et al. ................71/98

*Primary Examiner*—Leon Zitver
*Assistant Examiner*—Leo B. De Crescente
*Attorney*—Kinney, Alexander, Sell, Steldt & Delahunt

[57] ABSTRACT

This invention relates to aliphatic sulfonoxyphenylureas. These compounds may be utilized to destroy and/or prevent unwanted plant growth. Compositions containing and processes for preparing the compounds of the present invention are described.

11 Claims, No Drawings

ALIPHATIC SULFONOXYPHENYLUREAS

BACKGROUND OF THE INVENTION

1. Field of the Invention

The invention relates to sulfonated aromatic ureas and processes for their preparation, and to herbicides and herbicidal compositions.

2. Prior Art

Substituted phenylureas are known to the art. The compounds of the prior art include substituted phenylthioureas wherein a sulfur atom is bonded directly to the phenyl ring. Optionally, this sulfur atom may be substituted by one or two oxygen atoms. See U.S. Pat. No. 3,326,663. However, no reports of phenylureas wherein the substituent is an aliphatic sulfonoxy group are known.

Substituted perfluoroalkylsulfonoxyphenyl derivatives have been disclosed broadly in U.S. Pat. No. 3,346,612. However, the compounds described are not urea derivatives, nor are ureido groups suggested. The utility of the compounds of said disclosure is not herbicidal, nor is any biological or agricultural use suggested.

SUMMARY OF THE INVENTION

This invention relates to aliphatic sulfonoxyphenylureas which contain an oxygen atom bonded by one valence to the phenyl ring, while the other valence of the oxygen atom is bonded to an aliphatic sulfonyl group.

It is the aim of this invention to provide compounds useful as herbicides. It is another aim of this invention to provide compositions for destroying and/or preventing growth of unwanted plants. It is a further aim of this invention to provide a method for controlling unwanted plants.

It is a further aim of this invention to provide a process for the preparation of the compounds of this invention. Other aims of this invention will become evident from the disclosure herein.

DETAILED DESCRIPTION OF THE INVENTION

This invention relates to aliphatic sulfonoxyphenylureas of formula I:

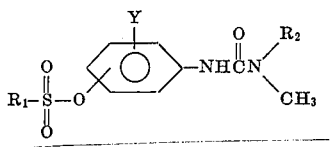

wherein $R_1$ is a straight or branched chain lower aliphatic radical, $R_2$ is methyl or methoxy and Y is hydrogen or halogen.

A lower aliphatic radical as used herein to define $R_1$ is a straight or branched alkyl chain of one to four carbon atoms which can be unsubstituted or substituted by one or more halogen atoms.

Preferred classes of the compounds of the invention include those in which $R_1$ is either a lower alkyl hydrocarbon radical (containing no halogen) or a lower fluoroaliphatic radical (containing at least one fluorine atom), especially perfluoroalkyl. Especially preferred are the compounds in which Y in the foregoing formula is hydrogen and $R_1$ is methyl or trifluoromethyl. These groups of compounds can be conveniently formulated with inert herbicidal carriers and, if desired, surfactants and/or other adjuvants, to form compositions useful for terminating the life cycles or at least controlling unwanted plants.

The compounds of the present invention are prepared by a sequence of reactions from known starting materials. The presently preferred sequence is illustrated hereinbelow. Unsubstituted and substituted aminophenols are well known to the art, as are aliphatic sulfonyl halides and anhydrides.

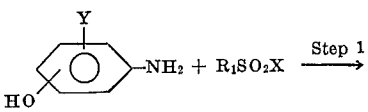

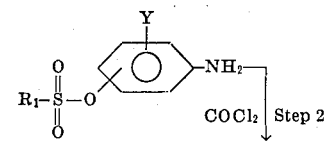

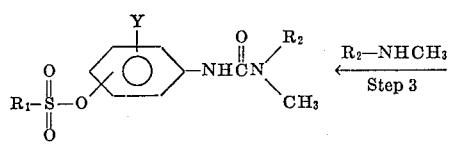

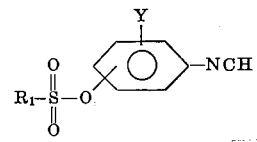

In the equation, X is halogen or an aliphatic sulfonate residue and Y, $R_1$ and $R_2$ are as defined above.

The aliphatic sulfonoxyanilines of Formula II (the products of step 1 in the foregoing reaction scheme) may be prepared by a variety of procedures, but the procedure outlined above is presently preferred because it is shorter, it proceeds readily and is more generally applicable. Among the alternative procedures available are the reduction of an aliphatic sulfonoxynitrobenzene; and the blocking of the amino group before sulfonylation and unblocking after sulfonylation.

The reaction of step 1 is generally run in the presence of an acid acceptor such as sodium carbonate, triethylamine, and the like. Alternatively, the alkali metal salt of the aminophenol may be preformed by reaction of the aminophenol with reactive metals or metal hydrides, such as sodium or sodium hydride, in aprotic solvents, or with an alkali metal hydroxide, such as potassium hydroxide, in water. The alkali metal salts of the amino phenols are generally isolated by evaporation of the solvent and are dried before reaction with the sulfonylating agent.

The reaction of step 1 is generally run in a non-reactive solvent. Suitable non-reactive solvents should dissolve the reactants substantially. Examples of the solvents are keytones such as acetone, methyl ethyl ketone, and the like, dichloromethane, ethyl acetate, 1,2-dimethoxyethane, and the like.

The reaction is usually carried out at moderate temperatures, that is between 0° and 50° C., but these temperatures may be varied depending upon the reactivity of the starting materials and the desired reaction time. Reaction time range is generally about 1 to 24 hours, depending on reaction temperature and reactivity of starting materials.

The reaction is preferably carried out under substantially anhydrous conditions in order to minimize decomposition of the sulfonylating agent. The use of a dry nitrogen atmosphere is suitable, but equivalent procedures are obvious to those skilled in the chemical art. The products are liquids which may be isolated and purified by distillation or solids which may be purified by conventional methods such as recrystallization and the like.

Step 2 involves the reaction of phosgene with the aliphatic sulfonoxyaniline. It is carried out in a non-reactive solvent such as ethyl acetate, usually at temperatures between 0° and 50° C., although higher or lower temperatures are possible. The isocyanate products, usually liquids, may be purified readily by conventional methods, and distillation at reduced pressure has been found to be a particularly useful technique. Reaction is rapid and is generally complete after slow addition of phosgene.

Step 3, the reaction of the isocyanate product of step 2 with dimethylamine or O,N-dimethylhydroxylamine proceeds readily between 0° and 50° C., usually at room temperature in a suitable solvent. Suitable solvents for this reaction include diethyl ether, dichloromethane, ethyl acetate and the like. The amines may also be generated from their hydrochlorides in situ by treatment with a base in a suitable solvent. Suitable solvent-base combinations include dimethylsulfoxide-triethylamine or water-diethyl ether-sodium hydroxide. Reaction is generally rapid and is substantially complete following the addition of dimethylamine or O,N-dimethylhydroxylamine, although stirring for up to 6 hours or more will insure completion of reaction.

As an alternative to the use of O,N-dimethylhydroxylamine in step 2, the same products can be prepared by methylation of an intermediate hydroxyurea, formed by the reaction of the isocyanate product of step 2 with N-methylhydroxylamine. Suitable solvents and reaction conditions are amply described in the technical literature.

The compounds of the invention are herbicidally effective against a wide range of both broad-leaved and narrow-leaved species in both pre- and post-emergence treatments. In addition, some of the compounds of the invention exhibit selective herbicidal action, that is, they permit the growth of useful cultivated crops, such as cotton, while preventing the growth of undesirable plants.

The presently preferred compounds of the invention are
3-(3-trifluoromethylsulfonoxyphenyl)-1,1-dimethylurea,
3-(3-trifluoromethylsulfonoxyphenyl)-1-methoxy-1-methyl-urea,
3-(3-methylsulfonoxyphenyl)-1,1-dimethylurea and
3-(3-methylsulfonoxyphenyl)-1-methoxy-1-methylurea.

The herbicidal activity of representative compounds of the invention was determined using screening tests against experimental plantings. Both pre- and post-emergence activity were determined in a direct screen against selected weed species. The following weed mixtures were used for the tests.

Grasses:
Giant foxtail (*Seteria faberii*)
Barnyard grass (*Echinochloa crusgalli*)
Crabgrass (*Digitaria ischaemum*)
Quackgrass (*Agropyron repens*)
Broadleaves:
Pigweed (*Amaranthus retroflexus*)
Purslane (*Portulaca oleracea*)
Wild mustard (*Brassica kaber*)
Wild morning glory (*Convolvulus arvensis*)

The test chemicals were dissolved in a small amount of acetone or other suitable solvent and then diluted with water to give a concentration of 2,000 ppm. From this concentration, aliquots were diluted to give a final concentration of 500 ppm. Eighty ml. of this solution were added to a 6-inch pot containing the weed seeds to give a concentration equivalent to 20 lb./acre.

To assess post-emergence activity, the same weed mixtures were allowed to grow from 2 to 3 weeks until the grasses were approximately 1 to 3 inches and the broadleaves 1 ½ inches tall. They were sprayed for approximately 10 seconds or until good wetting of the leaf surfaces occurred with a 2,000 ppm solution as described above.

In order to control unwanted plants the compounds of the invention can be used alone as herbicides, for example as dusts or granules of the compounds, or preferably they may be applied in formulations. The formulations are comprised of active ingredients and one or more herbicidal adjuvants and/or carriers. Formulations are useful to facilitate the application of the compounds and to achieve specific biological objectives such as controlling the availability of the herbicide, improving adherence to plants, and the like, as is well known to those skilled in the art.

The compounds of the invention may be formulated as wettable powders, emulsifiable concentrates, aqueous or non-aqueous solutions and/or suspensions, granules, dusts and the like. Said compounds can be finely divided and suspended in any of the usual aqueous media. Spreading agents, wetting agents, sticking agents or other adjuvants can be added as desired.

When emulsifiable concentrates are prepared, the active ingredient can be in a concentration of about 5 percent to 60 percent or more, depending upon its solubility. The units of concentration are weight per unit weight. The active ingredients are soluble in common organic horticultural solvents such as benzene, toluene, xylene, dichloromethane, chloroform, hexane and heptane or less highly refined aromatic or aliphatic hydrocarbons and mixtures thereof. Examples of these are coal tar fractions, straight run petroleum distillates, thermolytically or catalytically cracked hydrocarbon oil, gas oil, light lubricating oil fractions, kerosene, mineral seal oil, and the like. In appropriate cases oxygenated solvents such as ketones may be used in or as the carriers. These concentrates can be dispersed in water to permit the use of an aqueous spray. Admixture with a small amount of an organic surface active agent capable of lowering the surface tension of water is preferred.

Examples of surface active agents variously known as dispersing agents, wetting agents or emulsifying agents comprise soft or hard soaps, morpholine or dimethylamine oleate, sulfonated fish, castor and petroleum oils, sodium salt or lignin sulfonic acid, alkylated aromatic sodium sulfonates, such as decylbenzene sodium sulfonate, dodecylbenzene sodium sulfonate, butyl or other amine salts of decyl or dodecylbenaene sulfonic acid, sodium lauryl sulfate, disodium monolauryl phosphate, ethylene oxide condensation products of alkyl phenols, as for example actyl phenol, ethylene oxide condensation products of tall oil, ethylene oxide condensation products of higher alcohols or higher mercaptans. Mixtures of two or more surface active agents are also feasible. Generally, the surface active agent will comprise only a small proportion of the composition, say 0.1 to 15 percent by weight of the toxicant.

The formulation of dry compositions for application as granules, dusts or for further dilution with liquid carriers is readily accomplished by mixing the toxicant with a solid carrier. Such solid carriers will be of various sizes from dusts to granules. The techniques for such formulations are well known to the art. Suitable carriers include charcoal, talc, clay, pyrophyllite, silicas, fuller's earth, lime, diatomaceous earth, flours such as walnut shell, wheat, soya bean, cottonseed and wood flours, magnesium and calcium carbonate, calcium phosphate and the like. Powders may be granulated by the use of suitable binders such as cellulose derivatives, for example ethyl or carboxymethyl cellulose, corn syrup and the like. The compounds or the above formulations are applied by spraying, spreading, dusting or the like. The rate of application will of course vary, but the more active compounds of the invention exhibit satisfactory control of broadleaf and grass weeds at the application rate of about 5 to 30 lbs. per acre. It is of course to be expected that local conditions, for example temperature, humidity, moisture content of the soil, nature of the soil, and the like, may require greater or smaller amounts. Effective resolution of these factors is within the skill of those versed in the herbicidal art. Likewise, it is apparent that not all of the compounds included within the scope of the invention have equal activity.

The herbicidal compositions may contain one or more of the herbicidal aliphatic sulfonoxyphenylureas set out hereinbefore as the sole active species, or they may contain in addition thereto other biologically active substances. Thus, insecticides and fungicides may be incorporated in the compositions. Further, if desired, the herbicidal compositions may contain fertilizers, trace metals or the like and when applied directly to the soil may additionally contain nematocides, soil conditioners, plant growth regulators and/or herbicides of similar or different properties.

In order to further illustrate the invention the following non-limiting examples are provided. Melting points are uncorrected.

EXAMPLE 1

3-Methylsulfonoxyaniline

The sodium salt of 3-aminophenol (20.0 g., 0.15 mole) is mixed with 1,2-dichloroethane (110 ml.) under nitrogen, and methanesulfonyl chloride (17.4 g., 0.15 mole) is added dropwise with ice bath cooling. After stirring at room temperature for 18 hours, the mixture is poured into water and extracted with chloroform. The chloroform is dried and evaporated to a dark oil which is distilled under vacuum to yield 3-methylsulfonoxyaniline, b.p. 158°–172° C./0.2 mm.

EXAMPLE 2

2-Perfluorobutylsulfonoxyaniline

Triethylamine (150 ml.) and o-nitrophenol (28.8 g., 0.208 mole) are heated to reflux, then cooled to 27° C. Perfluorobutanesfulonyl fluoride (59.8 g., 0.198 mole) is added dropwise, and the solution is stirred, then heated to 50° C. Pyridine (10 ml.) is added, and the mixture is stirred at 50° C. for 45 minutes, then poured into a stirred mixture of ice (1,000 g.), water (100 ml.) and concentrated hydrochloric acid (100 ml.). The solid product is collected and washed with cold water, cold dilute sodium hydroxide (twice) in a blender, again with water, then on a filter with dilute acetic acid.

The product is reduced in ethanol (200 ml.), water (10 ml.) and concentrated hydrochloric acid. Iron filings (10 g.) and iron powder (11.7 g.) are mixed and added in small portions at a rate to maintain refluxing. Concentration hydrochloric acid (25 ml.), ethanol (10 ml.) and water (5 ml.) are added and the mixture is refluxed for 3.5 hours. The reaction mixture is filtered hot, then poured into ice water (500 ml.). The solid product is collected, dissolved in hot methanol (70 ml.) and filtered hot. Water (15 ml.) is added, then dilute sodium carbonate to adjust the pH to about 6. It is cooled, then heated again and methanol (15 ml.) is added. 2-Perfluorobutylsulfonoxyaniline is a tan solid, m.p. 37°–38° C. after drying.

Anal. calculated for $C_{10}H_6F_9NO_3S$: C, 30.7; H, 1.55; N, 3.6, F, 43.6
Found: C, 31.0; H, 1.7; N, 3.6; F, 43.6.

In each of the compounds containing the butyl group in Examples 2, 5, 6, 20, 21, 22 and 23, the group is normal butyl.

EXAMPLE 3

3-Trifluoromethylsulfonoxyaniline

Triethylamine (27.9 g., 0.0275 mole) and 3-aminophenol (30 g., 0.275 mole) are dissolved in dry acetone (175 ml.) under nitrogen. Trifluoromethanesulfonyl fluoride (41.8 g., 0.275 mole) is bubbled into this solution for 1- ½hour at room temperature. The solution is stirred for 3 hours, washed with 5 percent sodium hydroxide and water and evaporated. The resulting dark oil is distilled at 98°–99° C./0.4 mm. to afford pure 3-trifluoromethylsulfonoxyaniline.

Anal. calculated for $C_7H_6F_3NO_3S$: C, 34.8; H, 2.5

Found: C, 34.8; H, 2.6.

Using the general methods described in Examples 1 through 3 the following sulfonoxyanilines are prepared.

TABLE I

| Ex. No. | Compound | Melting Point or Boiling Point |
| --- | --- | --- |
| 4 | 2-trifluoromethylsulfonoxyaniline | b.p. 76° C./0.10 mm. |
| 5 | 3-perfluorobutylsulfonoxyaniline | b.p. 91–96°C./0.08 mm. |
| 6 | 3-butylsulfonoxyaniline | b.p. 180° C./0.15 mm. |
| 7 | 3-difluoromethylsulfonoxyaniline | b.p. 132° C./0.20 mm. |
| 8 | 4-trifluoromethylsulfonoxyaniline | b.p. 104–106°C./0.40 mm. |
| 9 | 3-trifluoromethylsulfonoxy-4-chloroaniline | b.p. 85° C./0.05 mm. |
| 10 | 3-trifluoromethylsulfonoxy-6-chloroaniline | b.p. 87° C./0.04 mm. |

Treatment of the aliphatic sulfonoxyanilines with phosgene afforded the corresponding isocyanates. The following specific example illustrates this procedure.

EXAMPLE 11

4-Trifluoromethylsulfonoxyphenylisocyanate

The compound 4-trifluoromethylsulfonoxyaniline (45.5 g., 0.189 mole) dissolved in 200 ml. of ethyl acetate is added dropwise over a period of 3 hours to ethyl acetate (350 ml.) saturated with phosgene. During the addition, phosgene is bubbled into the reaction mixture. After the addition is complete, the ethyl acetate is removed by distillation at atmospheric pressure, and 4-trifluoromethylsulfonoxyphenylisocyanate distills at 80° C./0.2 mm.

The aliphatic sulfonoxyphenylisocyanates are reacted with dimethylamine or O,N-dimethylhydroxylamine as illustrated by the following examples.

EXAMPLE 12

3-(3-Trifluoromethylsulfonoxyphenyl)-1-methoxy-1-methylurea

To O,N-dimethylhydroxylamine (2.28 g., 0.037 mole) dissolved in dimethylsulfoxide (50 ml.) is added dropwise 3-trifluoromethylsulfonoxyphenylisocyanate (10 g., 0.037 mole). The resulting reaction mixture is stirred for 45 minutes at room temperature and poured into water. The product is extracted with dichloromethane and recrystallized from hexane-benzene to afford analytically pure 3-(3-trifluoromethylsulfonoxyphenyl)-1-methoxy-1-methylurea, m.p. 64.3°–65.3° C.

Anal. calculated for $C_{10}F_{11}F_3N_2O_5S$: C, 36.6; H, 3.4; N, 8.6

Found: C, 36.4; H, 3.2; N, 8.6.

EXAMPLE 13

3-(3-Methylsulfonoxyphenyl)-1,1-dimethylurea

Dimethylamine was bubbled into 3-methylsulfonoxyphenylisocyanate until the amine was no longer absorbed. The resulting solid was recrystallized from 1,2-dichloroethane to afford analytically pure 3-(3-methylsulfonoxyphenyl)-1,1-dimethylurea, m.p. 140°–141° C.

Anal. calculated for $C_{10}H_{14}N_2O_4S$: C, 46.5; H, 5.5; N, 10.8

Found: C, 46.6; H, 5.4; N, 10.6.

Some of the compounds which are prepared according to the procedures of Examples 12 and 13 are listed below.

TABLE II

| Ex. No. | Compound | Melting Point or Boiling Point |
| --- | --- | --- |
| 14 | 3-(3-methylsulfonoxyphenyl)-1-methoxy-1-methylurea | m.p. 92–93°C. |
| 15 | 3-(3-trifluoromethylsulfonoxyphenyl)-1,1-dimethylurea | m.p. 79.5–81°C. |
| 16 | 3-(4-trifluoromethylsulfonoxyphenyl)-1,1-dimethylurea | m.p. 95.5–97° C. |
| 17 | 3-(4-trifluoromethylsulfonoxyphenyl)-1-methoxy-1-methylurea | m.p. 68.5–69° C. |
| 18 | 3-(3-difluoromethylsulfonoxyphenyl)-1,1-dimethylurea | m.p. 122–123.5° C. |
| 19 | 3-(3-difluoromethylsulfonoxyphenyl)-1-methoxy-1-methylurea | m.p. 82.5–84° C. |
| 20 | 3-(3-perfluorobutylsulfonoxyphenyl)-1,1-dimethylurea | m.p. 89.5–90.5° C. |
| 21 | 3-(3-perfluorobutylsulfonoxyphenyl)-1-methoxy-1-methylurea | m.p. 64–65° C. |
| 22 | 3-(3-butylsulfonoxyphenyl)-1,1-dimethylurea | m.p. 85.5–87.5° C. |
| 23 | 3-(3-butylsulfonoxyphenyl)-1-methoxy-1-methylurea | m.p. 86–87.5° C. |
| 24 | 3-(3-trifluoromethylsulfonoxy-4-chlorophenyl)-1,1-dimethylurea | m.p. 104–106° C. |
| 25 | 3-(3-trifluoromethylsulfonoxy-4-chlorophenyl)-1-methoxy-1-methylurea | m.p. 70–71° C. |
| 26 | 3-(3-trifluoromethylsulfonoxy-6-chlorophenyl)-1,1-dimethylurea | b.p. 148–155°C./0.20 mm. |
| 27 | 3-(3-trifluoromethylsulfonoxy-6-chlorophenyl)-1-methoxy-1-methylurea | b.p. 135–138°C./0.20 mm. |
| 28 | 3-(2-trifluoromethylsulfonoxyphenyl)-1-methoxy-1-methylurea | b.p. 112° C./0.15 mm. |
| 29 | 3-(3-fluoromethylsulfonoxyphenyl)-1,1-dimethylurea | |

What is claimed is:

1. A compound of the formula

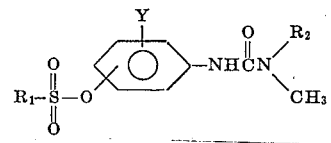

wherein $R_1$ is alkyl or fluoroalkyl of one to four carbon atoms, $R_2$ is methyl or methoxy and Y is hydrogen or chlorine.

2. A compound according to claim 1 wherein Y is hydrogen.

3. A compound according to claim 2 wherein $R_1$ is a lower alkyl hydrocarbon radical.

4. A compound according to claim 2 wherein $R_1$ is a lower fluoroalkyl radical.

5. A compound according to claim 2 wherein $R_1$ is a perfluoroalkyl radical.

6. A compound according to claim 3 wherein $R_1$ is methyl.

7. A compound according to claim 5 wherein $R_1$ is trifluoromethyl.

8. The compound 3-(3-trifluoromethylsulfonoxyphenyl)-1,1-dimethylurea.

9. The compound 3-(3-trifluoromethylsulfonoxyphenyl)-1-methoxy-1-methylurea.

10. The compound 3-(3-methylsulfonoxyphenyl)-1,1-dimethylurea.

11. The compound 3-(3-methylsulfonoxyphenyl)-1-methoxy-1-methylurea.

* * * * *

UNITED STATES PATENT OFFICE
CERTIFICATE OF CORRECTION

Patent No. 3,687,998      Dated August 29, 1972

Inventor(s) Robert D. Trepka

It is certified that error appears in the above-identified patent and that said Letters Patent are hereby corrected as shown below:

Column 1, after line 42, insert

-- This application discloses subject matter which is disclosed and claimed in the co-pending application of Arthur Mendel, Serial No. 45,204, filed June 10, 1970, and in a continuation-in-part application thereof, Serial No. 271,229, filed July 13, 1972. --.

Signed and sealed this 1st day of January 1974.

(SEAL)
Attest:

EDWARD M. FLETCHER, JR.
Attesting Officer

RENE D. TEGTMEYER
Acting Commissioner of Patents